(No Model.)  2 Sheets—Sheet 1.

P. W. ELLIOTT.
HEATING STOVE.

No. 551,114. Patented Dec. 10, 1895.

WITNESSES  INVENTOR

UNITED STATES PATENT OFFICE.

PERCIVAL W. ELLIOTT, OF READING, ASSIGNOR TO THE HIGHLAND FOUNDRY COMPANY, OF BOSTON, MASSACHUSETTS.

HEATING-STOVE.

SPECIFICATION forming part of Letters Patent No. 551,114, dated December 10, 1895.

Application filed July 30, 1894. Serial No. 518,910. (No model.)

*To all whom it may concern:*

Be it known that I, PERCIVAL W. ELLIOTT, of Reading, in the county of Middlesex and State of Massachusetts, have invented a new and useful Improvement in Heating-Furnaces, of which the following is a full, clear, and exact description, reference being had to the accompanying drawings, forming a part of this specification, in explaining its nature.

The invention relates especially to the damper or draft-controlling devices of a heating-furnace or heating-stove, and it comprises a pipe system of peculiar arrangement and character, combined with a damper and cold-air inlet peculiarly arranged in relation to each other and to the pipe system.

Figure 1:
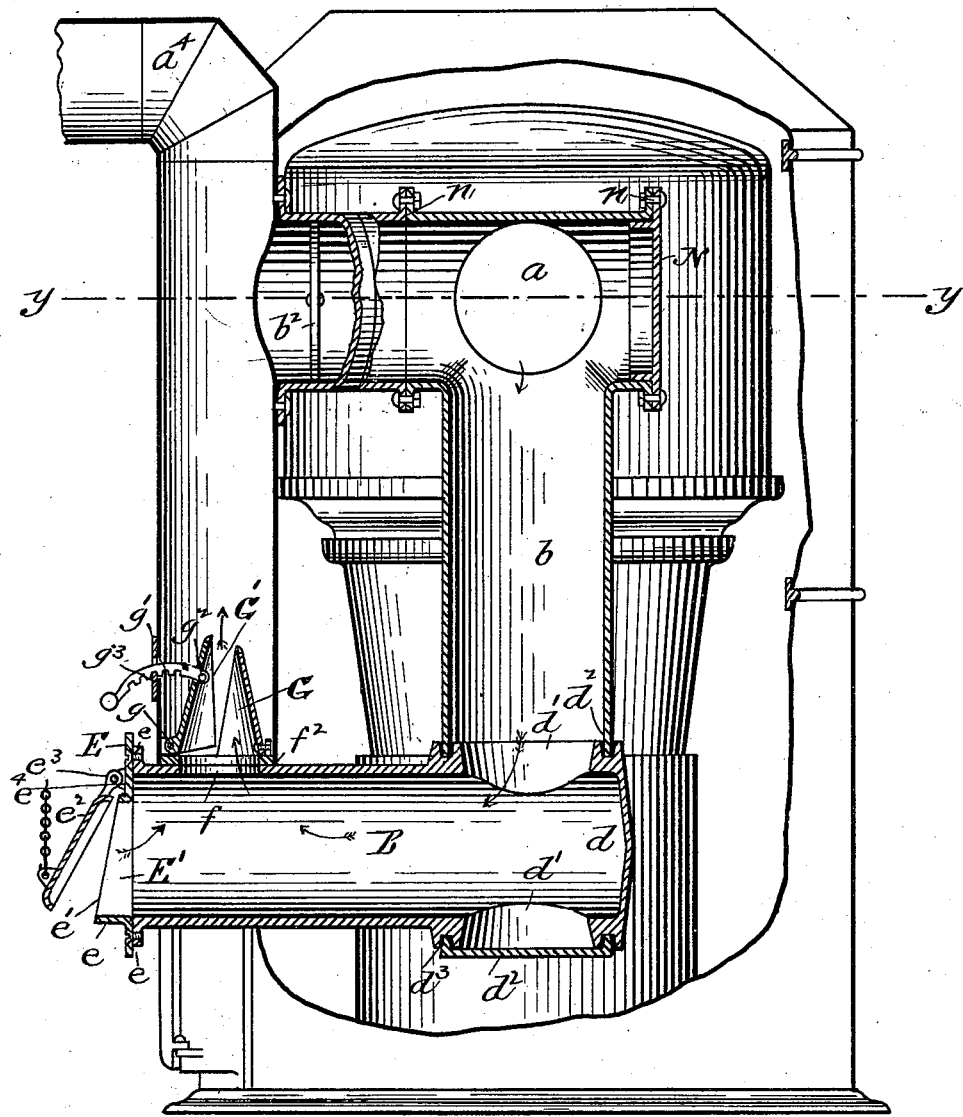
Figure 2:
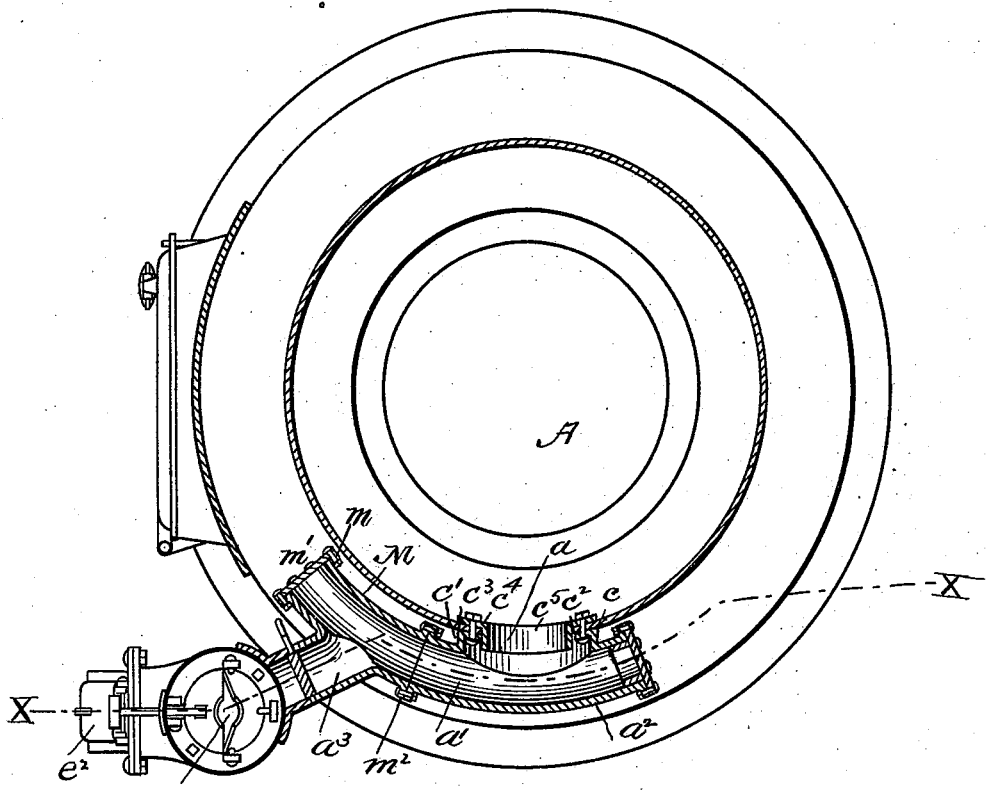

Referring to the drawings, Figure 1 is a view in vertical section upon the dotted line $x\ x$ of Fig. 2, showing in elevation parts back of said line. Fig. 2 is a view in horizontal section upon the dotted line $y\ y$ of Fig. 1.

It will be understood that the products of combustion, leaving the combustion-chamber A, pass through the opening $a$, which is the direct smoke-escape port, into the curved passage $a'$ in the curved pipe $a^2$, and from thence they may pass by the passage $a^3$ directly to the direct flue in the pipe $a^4$ to the chimney, or they may pass down the pipe $b$ to the curved horizontal pipe B, and thence upward to the direct escape through the uptake $b'$. There is a damper $b^2$ of ordinary type for regulating the size of or closing entirely the direct passage $a^3$. The pipe $a^2$ is cast integral with the pipe $b$, and it has on its inner side the flange $c$ at the end of the short inward extending section $c'$. This flange has a hole $c^2$ and bears against the radiator-shell $c^3$ and is bolted or otherwise attached to the flange $c^4$ of a collar $c^5$, the flange $c^4$ being upon the inside of the radiator-shell and the collar $c^5$ projecting through a hole in the radiator-shell and the hole in the flange $c$. (See Fig. 2.)

The pipe B has the box end $d$ cast integral with it, having the inlet $d'$ surrounded by the recess $d^2$, which receives the lower end of the pipe $b$ and provides for a gas-joint. It also has the hole $d^3$, which is closed by a cap $d^4$, which has a flange shutting into a gas-joint and recess $d^5$.

The outer end of the pipe B is open and has a flange $e^5$ surrounding it. To this flange is bolted or otherwise attached a plate E, which has a short hollow extension $e$, having the inclined edge $e'$ against which the hinged plate or door $e^2$ closes, this door being hinged at $e^3$ to ears $e^4$ upon the plate. This provides the cold-air inlet E' and means for regulating its size or closing it. There is also in the pipe B, close to its outer end, the hole $f$, by which connection is established with the uptake $b'$. This hole is surrounded by an annular plate $f^2$, which is bolted or otherwise attached to the pipe B, and which supports the stationary section G of a conical damper and the movable section G'. Both of these sections are in the lower part of the uptake $b'$ immediately over the hole $f$ and close to the cold-air inlet. Each section of the damper substantially forms half a hollow cone. The stationary part G is attached to ears extending up from the plate $f^2$. The movable part G' is hinged at $g$ to an ear upon said plate, and it is operated from without the pipe by the notched sector-latch $g'$, which is attached at $g^2$ to the movable section, extends out through a hole in the uptake, and the notches of which engage the edge of a latch-plate $g^3$. The uptake fits around the annular plate $f^2$, which, in substance, forms a collar for it. The movable section G' closes against the section G. The point of both sections is removed to provide a contracted passage $h$ (see Fig. 2) when the damper is closed, so as to leave a small gas-escape opening.

It will be seen that the casting which provides the pipes $a^2$ and $b$ is a right and left— that is, it is capable of being connected at either end with the pipe-section M from which the outlet $a^3$ extends. This result is obtained by providing the casting with flanges $n$ at each end of the horizontal section. To one flange the section M is attached, to the other a closing-plate N; but these are reversible at will, the section M having flanges $m$ to which the removable plate $m'$ is secured, and which plate may be used in connection with the flanges $m^2$ at the other end of the section.

In use, when the damper $b^2$ is open, the products of combustion pass from the combustion-chamber through the outlet $a$ directly to the uptake, as before observed. When the damper $b^2$ is closed, the products of combustion pass down the passage $b$, through the base passage in the pipe B, into the uptake $b'$, the strength of the draft being regulated by the damper G G' and by the cold-air inlet E', or by either—that is, when the cold-air inlet E' is closed it may be regulated, though not to so great an extent, by the dampers G G'.

It will be noticed that the pipes and dampers are arranged upon the side of the furnace and have connection with the combustion-chamber upon the side rather than at the back, and that this brings all the dampers at the front of the furnace and renders access to the pipes easy through the openings, which are also in a convenient position.

It will be seen that the pipe B is also a right and left, in that it has a double opening at its rear end, either one of which may be connected with the pipe $b$, in which event the other is closed, and the flange $e$ permits the plate E to be secured to it whichever side of the pipe B may be uppermost.

Having thus fully described my invention, I claim and desire to secure by Letters Patent of the United States—

1. In a heating stove or furnace the combination of the radiator shell having a side opening and the reversible curved pipe section $a'$ having the flanges $n$, one of which receives a closing plate N and the other of which connects with another pipe section, the outwardly extending section $a^3$ connected with the up-take $b'$, the damper $b^2$, the vertical passage $b$, and the curved horizontal pipe B, as and for the purposes described.

2. A heating stove or furnace having the curved base pipe, B, the pipe $b$ connecting the combustion chamber therewith, the up-take $b'$, the hole $f$ in the pipe $b$, the cold air inlet, the regulating door at its front end, and the damper G at the lower end of the up-take over the opening $f$, as and for the purposes described.

3. In a heating stove or furnace the curved pipe B, having the openings $d'$ at its inner end one of which receives the pipe $b$ and the other of which is closed by a cap $b^2$, the flange $e'$ about the outer end of the pipe B, a plate E secured to said flange, having a cold air inlet and a door for regulating the opening thereof, as and for the purposes described.

PERCIVAL W. ELLIOTT.

Witnesses:
F. F. RAYMOND, 2d.,
J. M. DOLAN.